United States Patent [19]

Fann

[11] Patent Number: 4,521,820
[45] Date of Patent: Jun. 4, 1985

[54] INSERT FOR BLOCKING OPERATION OF THE DISC WRITE SWITCH IN USE OF COMPUTER DISKETTES

[76] Inventor: James D. Fann, P.O. Drawer X, Simonton, Tex. 77476

[21] Appl. No.: 431,630

[22] Filed: Sep. 30, 1982

[51] Int. Cl.³ .............................................. G11B 23/02
[52] U.S. Cl. ...................................... 360/133; 360/66
[58] Field of Search ........................ 360/132, 133, 66

[56] References Cited

U.S. PATENT DOCUMENTS 3,950,786  4/1976  Shapley ................................. 360/60
4,053,935  10/1977  Shiba ..................................... 360/60
4,399,480  8/1983  Edwards ........................ 360/105 X Primary Examiner—John H. Wolff
Attorney, Agent, or Firm—Neal J. Mosely

[57] ABSTRACT

An insert for blocking the disk write arm notch of diskettes used in small computers, in word processors, and in other office machines, comprises an elongate slender insert positioned for sliding movement in the edge portion of the envelope of a diskette to block the write-protection notch thereof so that the read-write-erase functions of the machines are prevented from operation, so that accidental erasure or writing over of previously stored information will not occur. The insert is pushed in to block the notch, and withdrawn to unblock the notch, and may be shaped, colored, or otherwise distinctive in appearance at its outer end to identify the diskette.

3 Claims, 3 Drawing Figures

INSERT FOR BLOCKING OPERATION OF THE DISC WRITE SWITCH IN USE OF COMPUTER DISKETTES

BACKGROUND OF THE INVENTION

1. Field of the Invention

This invention relates to new and useful improvements in diskettes for computers or word processors, or the like, and more particularly to diskettes having a novel write-protection mechanism.

2. Brief Description of the Prior Art

Many small computers, word processors and other office machines, use small recording discs, called diskettes, for magnetically recording information or for transferring information to or from the computer or word processor. The diskettes have a notch in one side into which the disk drive switch arm must fall to energize the "write to disc" functions before introduction of information onto the recording disc of the diskette can be commenced. The notch may be closed to restrict machine operation to "read only". Once the diskette had been introduced into the diskette slot of the computer, it is not possible to tell whether the "write protect" notch is open or closed. Further, it is not always possible to determine the type of diskette which is in the disc drive. The purpose of this invention is to provide an apparatus for making the use of computer diskettes more satisfactory and efficient.

The prior art discloses a variety of controls for magnetic diskettes, but does not solve the problem of write protection in a mechanism integral with the diskette.

Diskettes have been provided with write protection by means of tapes applied over the notch. This tends to be messy and not readily adjustable in use and does not provide an external indication as to whether the diskette is write-protected.

Bowers U.S. Pat. No. 4,120,012 discloses a novel door mechanism and its relation to the diskette in a computer or word processor.

Rein U.S. Pat. No. 4,188,650 discloses a computer or word processor with a diskette slot provided with an auxiliary disc which is rotated to a position providing write protection.

Hatchett et al U.S. Pat. No. 4,185,314 discloses an ejection mechanism for record discs.

Vogt U.S. Pat. No. 4,320,430 discloses a cartridge-closure mechanism for a recording disc.

Sopher U.S. Pat. No. 2,487,900; Kubik et al U.S. Pat. No. 3,068,442; and Heidecker et al U.S. Pat. No. 3,959,823 disclose various mechanisms having control tabs, but none which is relevant to computer diskettes.

SUMMARY OF THE INVENTION

One of the objects of this invention is to provide an apparatus for opening and closing the write-protect notch of diskettes in order to safeguard information stored therein.

Another object of the invention is to provide an apparatus in the form of an insertable strip adapted to close the switch notch of a diskette from the exterior of the computer so that the diskette need not be removed for inspection or for either closing or opening of the write-protect switch slot.

Yet another object of the invention is to provide a diskette write-protect apparatus which is inexpensive, yet which is durable and reliable in use.

A further object of the invention is to provide a diskette write-protect apparatus which having a distinctive end signifying the type of diskette in use.

Other objects and advantages of the invention will become apparent from time to time throughout the specification and claims as hereinafter related.

As explained above, the diskettes used for recording in many small computers have a side switch arm notch into which the computer switch arm must fall before writing to the diskette can take place. It has been the custom to cover the switch arm notch when writing to the diskette is not desired. Since pre-recorded information on a diskette may be accidentally written over and erased if the switch notch is left open, many users of diskettes cover the side notch with an adhesive strip such as drafting tape when it is used in the read-only mode.

When editing or alteration or erasure of the diskette is desired, the tape is removed. After several removals and replacements, the tape is no longer satisfactory and a new piece of drafting tape must be obtained. This is messy and troublesome, especially when time is short. The gummy deposits left by the adhesive are almost impossible to remove.

According to the invention, a plastic strip insert is provided which may be inserted to close the diskette switch notch or slot when it is not desired that recording or editing be done. The diskettes have thin circular plastic discs which are coated with ferromagnetic material and which are supplied in protective envelope covers, and the plastic strip insert is designed to slide beneath a flap of the envelope in order to block the switch slot quickly and reliably.

The position of the plastic strip insert may be viewed from the exterior of the computer with the diskette in the disc drive slot, so that it can readily be determined whether or not the switch notch or slot is closed. The strip insert end may be shaped and/or color coded in order to signify the type of program on the diskette which is in the disc drive slot.

DESCRIPTION OF THE PREFERRED EMBODIMENT

Figure 1:
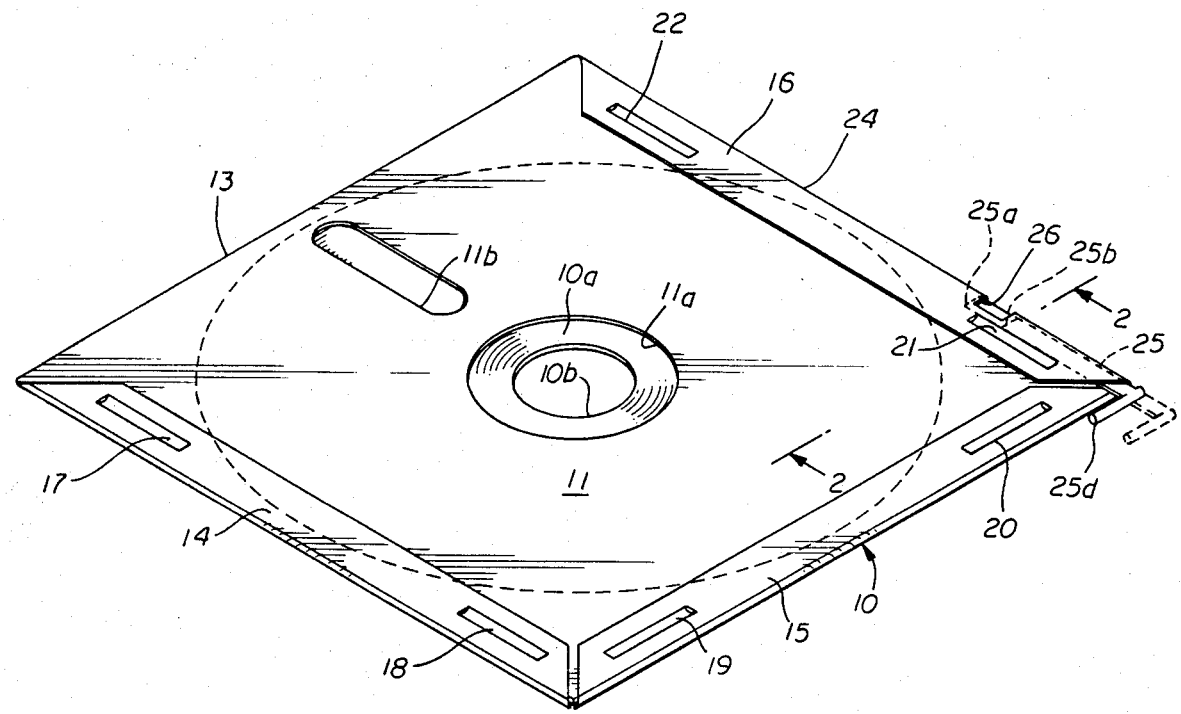
FIG. 1 is an isometric view of a computer or data processing diskette incorporating a preferred embodiment of this invention.

Referring now to the drawings in detail, a computer or word processor diskette 10 is shown which includes an envelope having a back layer 11 and a front layer 12. The back layer 11 and the front layer 12 are joined along a fold 13. The back layer 12 has edge flaps 14, 15 and 16 which are folded over the edges of the back layer 11, as shown. The flaps 14–16 are bonded to the back layer 11 at areas 17–22.

Figure 2:
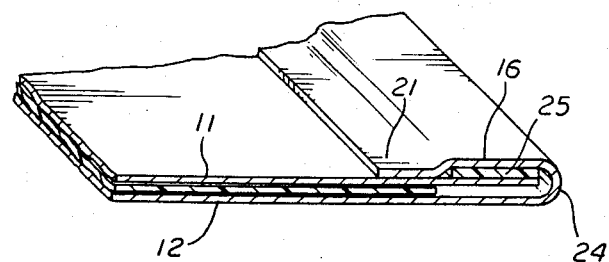
FIG. 2 is a partial cross sectional view taken on the line 2—2 of FIG. 1.

The bent edge 24 between layer 12 and flap 16 is far enough from bond area 21 that an insert 25 in the form of a flat strip may be inserted between flap 16 and top layer 11 as clearly shown in FIG. 2. A notch 26 of diskette 10 may be closed by the inserted element 25 when its end is at position 25a wherein the insert 25 is disposed through notch 26. When the inset 25 is moved out so that its end is at position 25b short of notch 26, then notch 26 is opened so that the disk write switch may fall into the notch to permit disc-write operation.

As shown in FIG. 1, the diskette 10 has therewithin a recording disc 10a of circular shape, coated with ferromagnetic material, which has a central circular opening 10b to be engaged by the disk drive. Back layer 11 and front layer 12 of the envelope have somewhat larger circular concentric openings 11a and 12a. Back layer 11 and front layer 12 also have slot openings 11b and 12b through which the recording head of the computer may engage the recording disc 10a. Slots 11b and 12b may be at any location and of any size desired consistent with the disk drive operation.

It will be readily understood that when the diskette 10 is inserted into the disk drive, fold 13 first, the notch 26 is inside the disk drive where it may not be easily observed. Yet by moving insert 25 in or out between its end positions 25a and 25b, the notch 26 may be closed and opened as desired as many times as may be necessary. The outer end 25d of insert 25, however, can be seen from outside the disc drive slot and gives an easily seen indication as to whether the diskette is write-protected.

Figure 3:
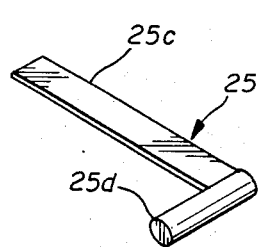
FIG. 3 is an isometric view of the switch blocking insert according to the invention.

It should be noted that insert 25 may be easily pushed in, but cannot be easily pulled out unless the diskette is slightly retracted or the outer end 25d is of a configuration permitting easy access. Referring to FIG. 3, the insert strip 25, preferably formed of plastic or similar non-magnetic sheet material, has a flat strip portion 25c and an outer end 25d. Outer end 25d may, instead, be knob shaped or of other suitable convenient form. Outer end 25d may readily grasped by the fingers or finger nails to move strip 25 in, or to move strip 25 out, or to completely remove strip 25 if desired after the diskette has been partially retracted from the disc drive slot. Furthermore, outer end 25d may be colored or shaped, or otherwise distinctively configured in order to indicate the type of program on the diskette 10. Insert 25 may be of thin rod or other suitable form if desired.

I claim:

1. A computer diskette, for use in a computer having a disc drive slot with a door closing the entrance thereto and a disc drive write switch arm adjacent one end of said entrance which controls the read-write-erase function by following into an edge slot adjacent to one corner of said diskette, comprising a single, thin, flat circular recording disc of magnetic material,
a thin, flat envelope, having an enlarged central opening, enclosing and supporting said disc for rotary movement therein,
said envelope having a notch in one edge portion, adjacent to one corner thereof, adapted to be positioned with said notch at said one end of said entrance and normal thereto, for entrance of the computer disc drive write switch arm thereinto, permitting movement of such switch arm to a selected position permitting the computer to write to the diskette,
a slide strip slidably positioned within said one edge portion substantially coplanar with said envelope and having an outer end portion, extending into said drive slot entrance when positioned in said drive slot, said outer end portion being positioned to be grasped for manual operation from outside the computer disc slot when said diskette is positioned therein for computer operation,
said strip being manually movable longitudinally to one position extending through and blocking said notch and to another position opening said notch said outer end portion extending into said drive slot entrance when in said open position and providing a visual indication that said notch is not write-protected.

2. A diskette according to claim 1 in which
said slide strip outer end portion has a distinctive appearance for indicating the type of program thereon.

3. A diskette according to claim 1 in which
said envelope is of folded construction with a front layer and a back layer and having edge flaps bent from one layer over the other layer and bonded thereto,
said notch being in one of said edge flaps,
said one edge flap having a longitudinally extending passage defined by the rebent edge thereof and the bonded portions thereof and open at one end at an adjcent edge of said envelope,
said slide strip being of a thin flat elongated material slidably positioned in said passage and having said outer end portion extending outside said passage said strip having longitudinal movement in said passage by manual operation of said extending outer end portion.

* * * * *